(No Model.)
P. KIRK.
SLEEPER FOR PERMANENT WAYS.
No. 326,874.  Patented Sept. 22, 1885.
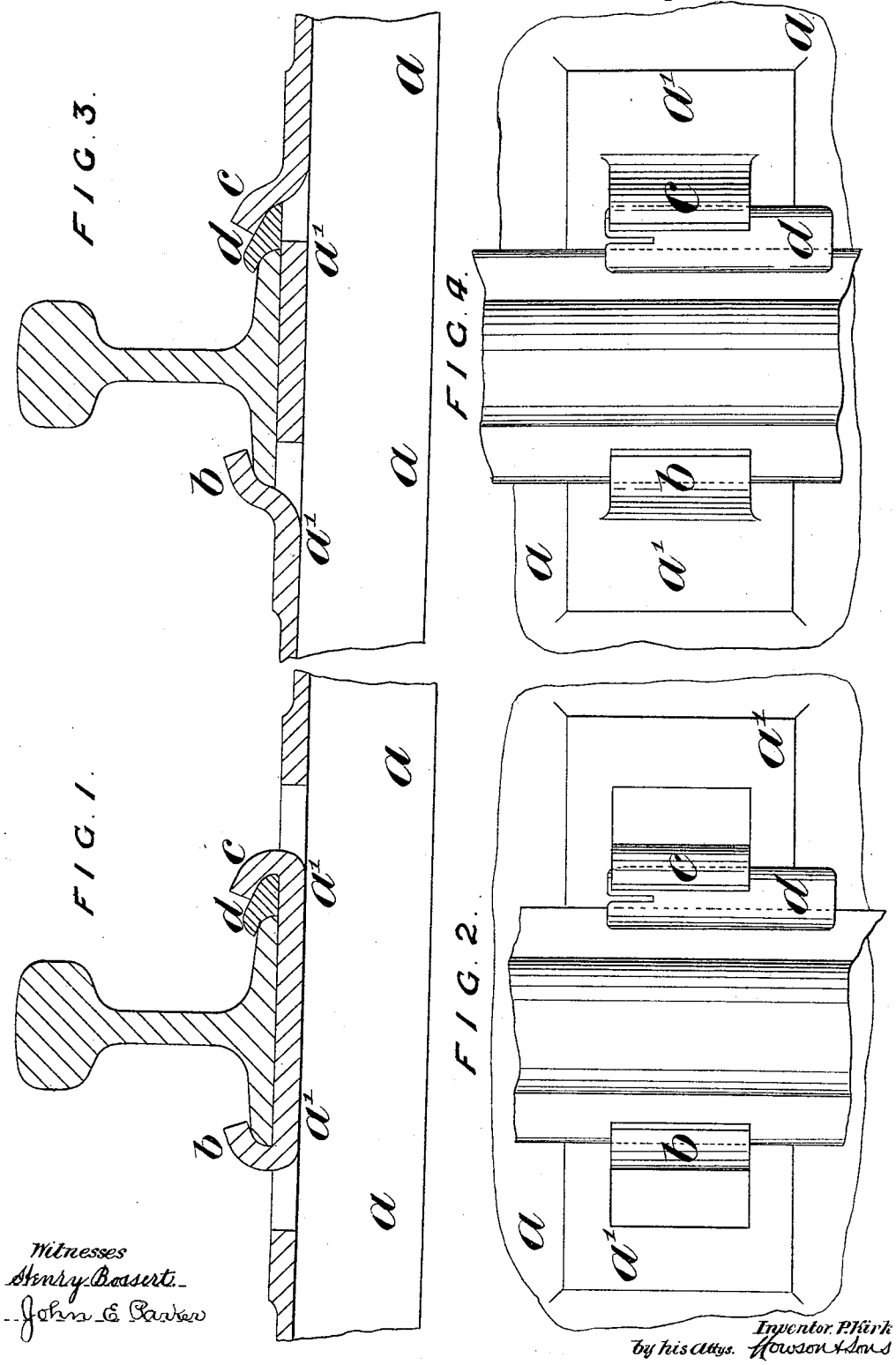

UNITED STATES PATENT OFFICE.

PETER KIRK, OF WORKINGTON, COUNTY OF CUMBERLAND, ENGLAND.

SLEEPER FOR PERMANENT WAYS.

SPECIFICATION forming part of Letters Patent No. 326,874, dated September 22, 1885.

Application filed February 26, 1885. (No model.) Patented in England January 20, 1885, No. 785; in France January 31, 1885, No. 154,190; in Belgium February 2, 1885, No. 67,722, and in Spain February 21, 1885, No. 1,137.

*To all whom it may concern:*

Be it known that I, PETER KIRK, a subject of the Queen of Great Britain and Ireland, and residing at Workington, county of Cumberland, England, iron and steel manufacturer, have invented certain Improvements in Sleepers for Permanent Ways, (for which I have obtained a patent in Great Britain, No. 785, dated January 20, 1885,) of which the following is a specification.

My invention relates to the steel and iron sleepers for the permanent way of railways and tramways; and my object is to dispense with the use of chairs, which require to be separately formed, and which have to be attached to the sleeper. I so roll or prepare the sleeper as to obtain places of increased thickness at the points where the rails will be attached to the sleeper, and from this thicker material I form holding jaws or clips by cutting or punching the metal in such a way as to press out parts which are not entirely detached from the sleeper, but are shaped into the required forms to hold the rail.

In the accompanying drawings, two examples of the forms which these holding jaws or clips may take are given. Figure 1 represents a longitudinal section of part of a cross-sleeper with a rail in position as secured to the sleeper, and Fig. 2 is a plan of the same parts.

In the said figures, $a$ is the sleeper, and $a'$ are the parts which are made to be of increased thickness. This increased thickness may be obtained by any suitable means. The holding-jaws are represented by $b\ c$. These jaws are produced by a punching operation, the punch being so formed as to sever the metal on three sides of a rectangle without cutting the fourth side. The punch and die are so formed as to press this partly-severed part outward from the face of the sleeper and to curve and shape it into the required form, as represented in the drawings, or into any other form suitable to the requirements.

It may be necessary or desirable to complete the shaping of the jaws or clips by a subsequent pressing or shaping operation, especially in the example illustrated by Figs. 1 and 2, wherein the parts to form the jaws have to be turned over and bent inward toward each other. In Figs. 3 and 4 the formation of the jaws or clips is simplified. It will be seen that in this case the parts to form the jaws are only pressed outward and shaped into form. This method is the one I prefer to adopt, as the shaping of the jaws is more readily effected.

To secure the rail of the indicated form to the improved sleeper it is only necessary to drive a key, $d$, between the foot of the rail and the jaw $c$. In the example this key is split at one end, so that it can be expanded to prevent accidental loosening of the fastening.

I do not confine myself to the exact forms of the jaws $b$ and $c$, nor to the rectangular form of the thickened parts of the sleeper. I may make the thicker parts extend entirely across the width of the sleeper and be either of uniform thickness or be tapered down to the thickness of the main body of the sleeper.

I do not claim the method of forming the holding-jaws or clips, excepting when the sleeper is made thicker at the required places so as to obtain jaws of a suitable strength, as jaws so formed in a sleeper made of the usual thickness throughout would be much too weak for their intended purpose.

What I claim is—

1. The sleeper with holding jaws or clips $b\ c$, for holding a rail formed out of the metal of the sleeper, the sleeper being made thicker at the places where the jaws or clips are to be formed, as and for the purposes set forth and indicated.

2. A steel or iron sleeper for permanent ways made thicker in two places in its length and having parts of these thicker portions punched or cut so as to be partly separated and raised or pressed out so as to form jaws or clips to answer as chairs to hold a rail, substantially as set forth and indicated.

In testimony whereof I have signed my name to this specification in the presence of two subscribing witnesses.

PETER KIRK.

Witnesses:
 EDWARD K. DUTTON,
 DAVID FULTON.